United States Patent [19]

Genusov et al.

[11] Patent Number: 5,263,169
[45] Date of Patent: Nov. 16, 1993

[54] BUS ARBITRATION AND RESOURCE MANAGEMENT FOR CONCURRENT VECTOR SIGNAL PROCESSOR ARCHITECTURE

[75] Inventors: Alexander Genusov; Ram B. Friedlander, both of Haifa, Israel; Peter Feldman, Pittsburg, Pa.; Ricardo Jaliff, Haifa, Israel

[73] Assignee: Zoran Corporation, Santa Clara, Calif.

[21] Appl. No.: 784,740

[22] Filed: Oct. 20, 1991

Related U.S. Application Data

[63] Continuation of Ser. No. 431,559, Nov. 3, 1989, abandoned.

[51] Int. Cl.⁵ .......................................... G06F 15/347
[52] U.S. Cl. .................................... 395/800; 395/375;
364/DIG. 1; 364/229; 364/230; 364/231.5;
231.6/231.8; 231.6/231.9; 231.6/232.8;
231.6/247; 231.6/247.2; 231.6/247.4;
231.6/247.6; 231.6/251; 231.6/251.5
[58] Field of Search ............ 364/200, 900, 967.4, 364/DIG. 1, DIG. 2; 395/375, 650, 700, 725, 775, 425, 800

[56] References Cited

U.S. PATENT DOCUMENTS

| | | | |
|---|---|---|---|
| 3,611,306 | 10/1971 | Reigel | 395/650 |
| 3,934,232 | 6/1976 | Curley et al. | 395/200 |
| 4,152,761 | 5/1979 | Louie | 395/650 |
| 4,384,324 | 5/1983 | Kim et al. | 395/375 |
| 4,399,504 | 8/1983 | Obermarck et al. | 395/650 |
| 4,435,780 | 3/1984 | Herrington et al. | 395/725 |
| 4,438,489 | 3/1984 | Heinrich et al. | 395/725 |
| 4,553,202 | 11/1985 | Trufyn | 395/725 |
| 4,589,067 | 5/1986 | Porter et al. | 395/800 |
| 4,661,900 | 4/1987 | Chen et al. | 395/800 |
| 4,727,487 | 2/1988 | Masui et al. | 395/67 |
| 4,733,346 | 3/1988 | Tanaka | 395/325 |
| 4,755,931 | 7/1988 | Abe | 395/800 |
| 4,847,755 | 7/1989 | Morrison et al. | 395/650 |
| 4,890,227 | 12/1989 | Watanabe et al. | 395/800 |
| 4,901,230 | 2/1990 | Chen et al. | 395/325 |
| 4,939,638 | 7/1990 | Stephenson et al. | 395/375 |
| 4,949,247 | 8/1990 | Stephenson et al. | 395/800 |
| 5,041,969 | 8/1991 | Kawasaki et al. | 395/375 |
| 5,050,070 | 9/1991 | Chastain et al. | 395/375 |

Primary Examiner—Allen R. MacDonald
Assistant Examiner—Ayaz R. Sheikh
Attorney, Agent, or Firm—Townsend and Townsend Khourie and Crew

[57] ABSTRACT

A concurrent vector signal processor includes a resource manager for utilization of captive signal processing resources. The first instructions in a temporary instruction queue are predecoded and the signal processing resources are selected to execute those first instructions.

Arbitration system is provided for external buses connected to a concurrent vector signal processor. A processor arbiter supervises on a priority basis both captive processor resources and independent processor resources. A bus arbiter supervises on a priority basis external and internal buses.

10 Claims, 3 Drawing Sheets

BUS ARBITRATION AND RESOURCE MANAGEMENT FOR CONCURRENT VECTOR SIGNAL PROCESSOR ARCHITECTURE

This is a continuation of application Ser. No. 07/431,559, filed Nov. 3, 1989, now abandoned.

BACKGROUND OF THE INVENTION

The invention relates to a high speed computing apparatus and more particularly to a concurrent architecture for signal and image processing which incorporated multiple processing units.

Signal processing algorithms operating with huge amounts of data require an extremely high processing throughput. A common way to achieve high throughput is to use arrays of processing elements in different configurations like SIMD (Single Instruction Multiple Data) or MIMD (Multiple Instructions Multiple Data). To the present, only a few designs have attempted to implement MIMD architectures in a single integrated circuit.

A MIMD architecture operating on signals and images requires a very efficient utilization of the internal resources for a high operation throughput. This requirement becomes even more severe for a single Input/Output port system.

OBJECTS OF THE INVENTION

It is an object of the invention to process signal data in an improved manner.

It is another object of the invention to process signal data with higher computation throughput.

It is another object of the invention to process signal data with a greater storage bandwidth.

It is another object of the invention to provide optimal utilization of processing resources.

It is another object of the invention to improve the control over simultaneous operations of data movement, vector arithmetic, register arithmetic and program flow.

SUMMARY OF THE INVENTION

These and other objects, features and advantages are achieved by the concurrent vector signal processor architecture disclosed herein.

To support concurrent operation of the concurrent vector signal processor an original mechanism of resource allocation and bus arbitration has been introduced. The concurrent vector signal processor architecture allows concurrent execution of different types of instructions if (and only if) they share no internal resources. Internal resources can be divided into two distinct groups. An availability of resources from both groups is checked by the Resource Manager before new instruction initialization. The instruction sequence is split in a number of subtasks that require different processing units to be executed.

Internal and external buses operation is controlled by the Arbiter, which allocates the buses to one of the processing units in accordance with requests and priority scheme. The bus allocation is valid for a single instruction cycle and the whole process is renewed every cycle.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
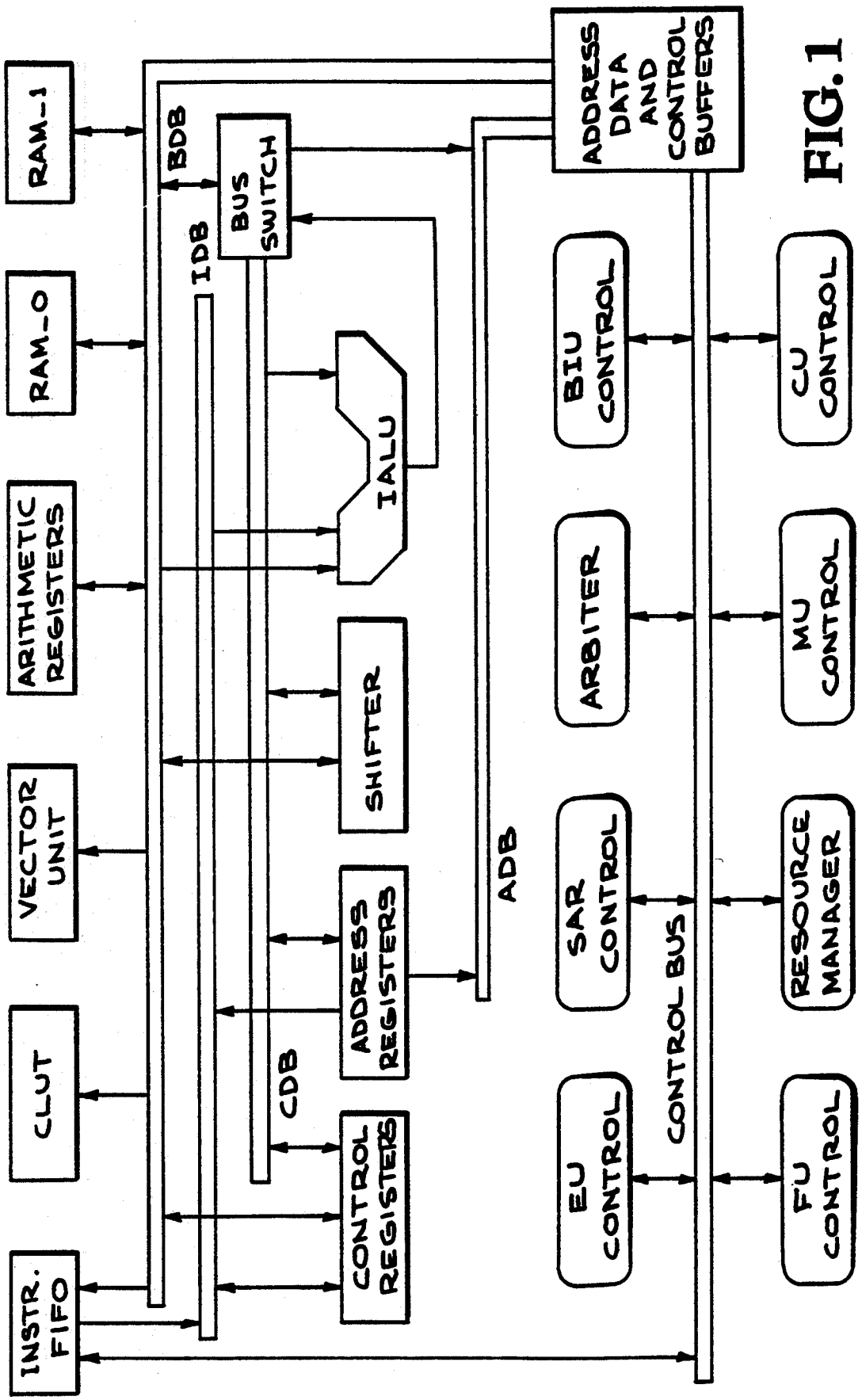
FIG. 1 is a functional diagram of resource management and bus arbitration.

FIG. 1 illustrates an embodiment of resource management and bus arbitration mechanisms in the concurrent vector signal processor. Detailed description unit is given below.

INTERNAL RESOURCES MANAGEMENT

The concurrent vector signal processor architecture allows concurrent execution of different type of instructions if and only if they do not share common internal resources. The internal resources can be divided into two distinct groups.

Figure 2:
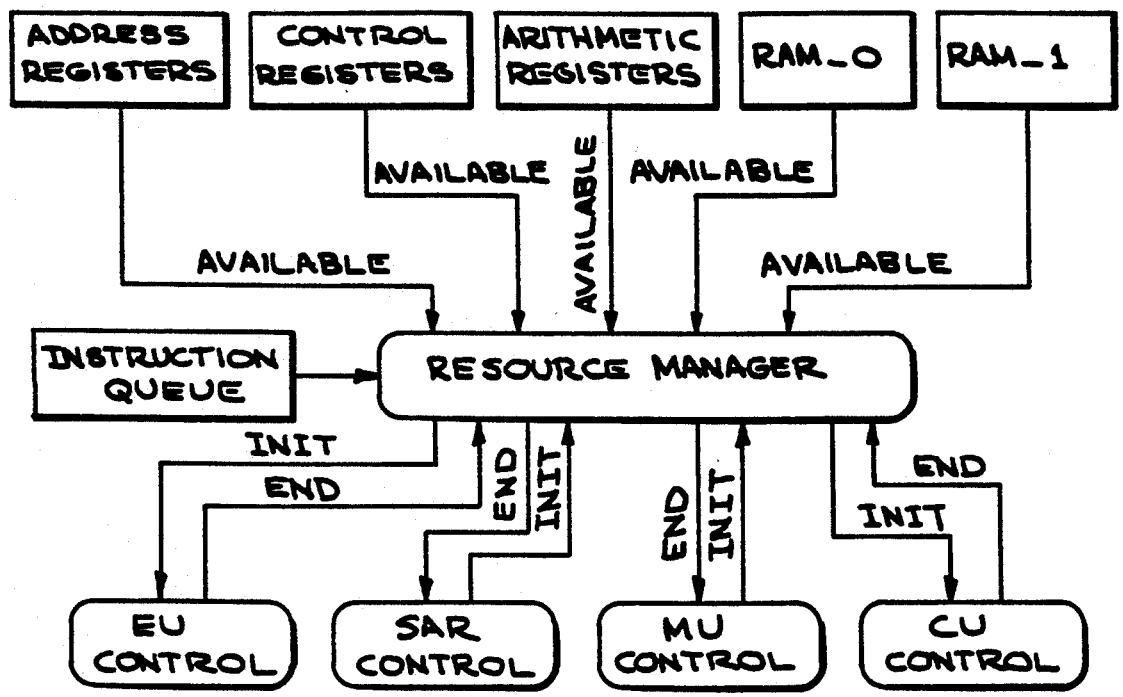
FIG. 2 shows internal resources.

- As shown in FIG. 2, the first group includes resources that are not shared between instructions until the execution of the instruction that uses these resources is completed. This group includes storage resources such as the internal RAM, Control, Address and Arithmetic registers and processing units such as the Execution Unit, Move Unit, Control Unit, Fetch Unit and the SAR mechanism. The storage resources are accessible by several internal processing units and can be allocated to an activated processing unit when required. Other instructions can employ these resources only after completion of the current instruction.

- As shown in FIG. 1, the second group consists of the Integer ALU, Shifter and inter-unit busses. Operations that utilize these resources are supervised by the Arbiter, and resource allocation can be changed every clock (the arbitration cycle is renewed every clock). Thus, allocation of these resources is dynamic and strongly depends on the priority of the operation.

The vector nature of the instructions creates the situation in which a number of consecutive instructions can be initiated sequentially and executed concurrently. The Resource Manager performs predecoding of the first instruction in the instruction queue and determines the resource requirements. If all required resources are available, the Resource Manager initializes operation by issuing the INIT signal to a proper processing unit. After initialization the instruction is removed from the queue, though four last instructions can be saved for internal instruction loop.

Some of the concurrent vector signal processor instructions utilize the second group of resources during the initialization phase and their execution can be started only if the Arbiter grants the inter-unit busses to the Resource Manager. The special synchronization instruction can cause the Resource Manager to wait for a specified condition(s) to become true, thus allowing synchronization of operations of different types which utilize the same internal resources. This internal semaphore mechanism guarantees correct program flow. It is also used for synchronization with the external event.

Figure 3:
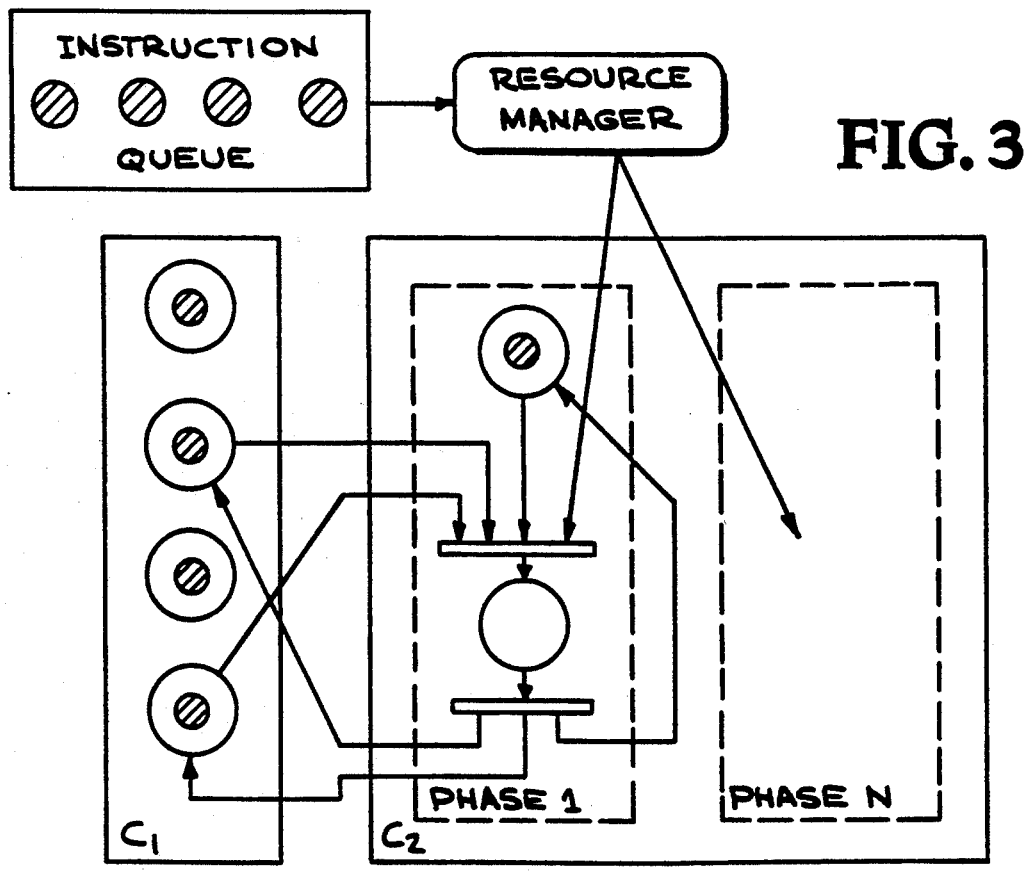
FIG. 3 presents a Petri Net model of the resource management scheme.

FIG. 3 represents the concurrent behavior of the ZSP-325 by a Petri Net model. The internal processing units, registers, memories and busses, essential for instruction execution are treated as shared resources and represented in the model as subnet $C_1$. Tokens placed in the shared resource mark its availability. At initialization all shared resources are marked with tokens.

We view an instruction execution process as split into phases, in accordance with the number of processing units necessary for its completion. The execution phases for all instructions are visualized as a subnet $C_2$. The Resource Manager reads instructions from the queue and assigns tokens to the required execution phases. A phase execution is enable only if all the required resources are available (marked). Tokens are removed from the resources on phase initialization and are returned upon phase completion. That scheme of resource allocation enables concurrent execution of several phases with guaranteed deadlock avoidance.

ARBITRATION OF BUS OPERATIONS

Four different processing units can require an external memory access simultaneously; the CU, MU, FU and SAR mechanism. Conflicts in external bus access are resolved by the internal Arbiter, which operates on clock by clock basis according to the following priority scheme:

The Fetch Unit is assigned the first priority if the instruction FIFO is empty or has only one instruction.

The SAR mechanism is assigned the second priority to store Arithmetic Registers during Arithmetic instruction execution.

The Control Unit is assigned the third priority on any operation.

The Move Unit is assigned the fourth priority when a Move or an Arithmetic instruction requires an external memory access.

The Fetch Unit is assigned the fifth priority if the instruction FIFO has more than one instruction.

Figure 4:
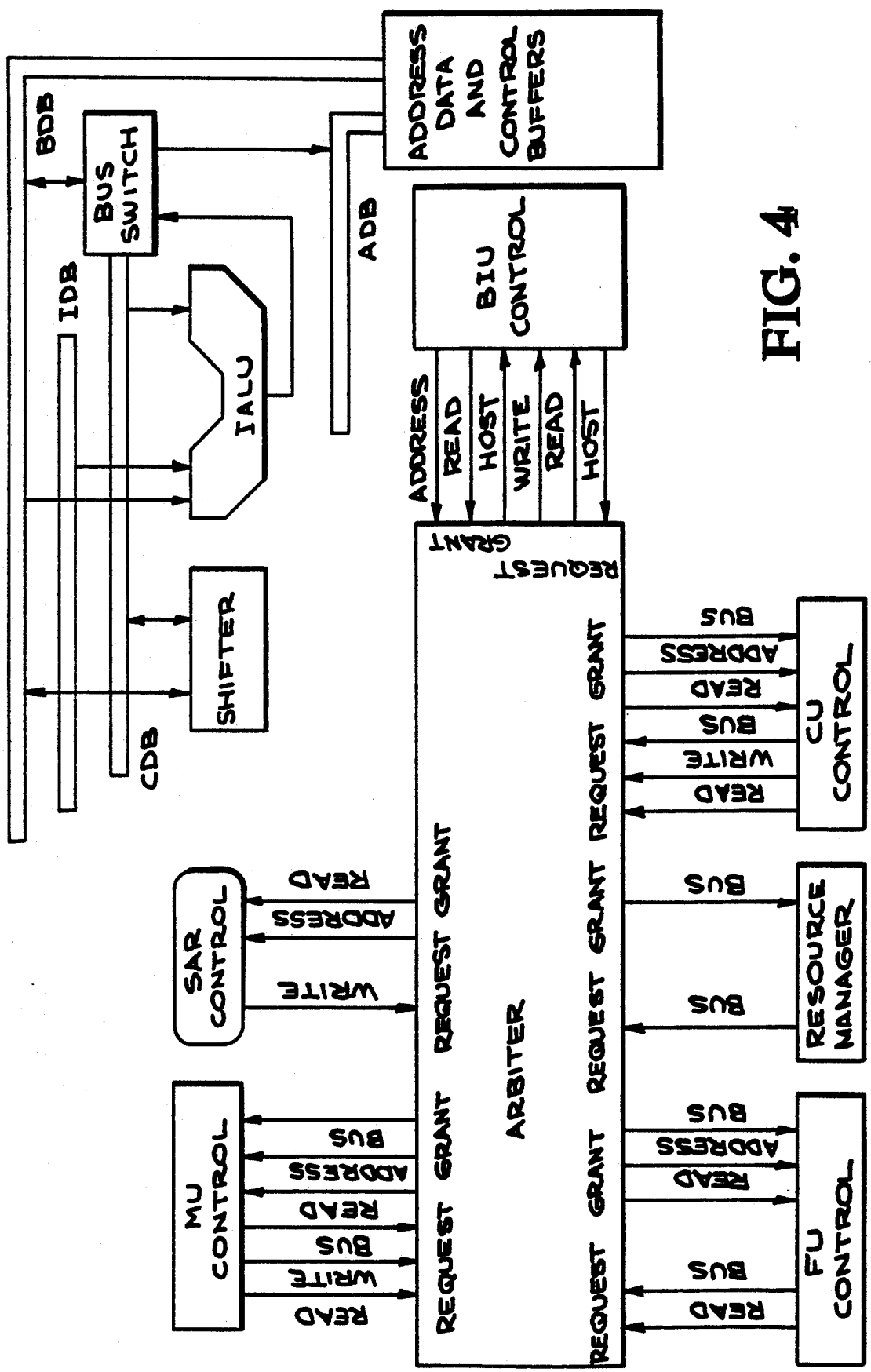
FIG. 4 shows a simplified scheme of the internal arbitration.

The bus protocol employs a Request - Grant handshake, as shown in FIG. 4. In the case of read request address and read grants are returned for address asserting and valid data latching, respectively. Usually, a delay in returning grant to the unit requesting for bus operation will cause an equal delay in the instruction completion. The exception of this rule is for arithmetic operations on external vector operands, which use internal data buffer.

The Arbiter supervises operations which may use external and internal buses. The optimization scheme is targeted to keep all internal units busy as long as the instruction queue is not empty. When the instruction queue becomes empty, fetching of a new instruction receives the highest priority. After decoding a new instruction, the Resource Manager initiates the appropriate processing units, once all required resources are allocated. Instruction initialization in conjunction with address computation are assigned the highest priority to access the Integer ALU and the internal bus. Operations that require only the internal bus, are usually short. To avoid a situation where a unit requires a short access to internal bus while other unit has continuous access to the external bus, the internal bus access is granted to the first unit every other clock. As a consequence, the external bus access is slowed down to two clock cycles for each bus access. If the concurrent vector signal processor operates with slow memory, the internal bus operations are interleaved with external memory access.

The Arbiter supports immediate release of the external bus when bus acknowledge signal is withdrawn. Furthermore, internal bus operations are disabled when the processor is accessed by an external device. This feature facilitates a use of external host to control the concurrent vector signal processor operations in run time.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. A resource utilization management system for a concurrent vector signal processor having an integrated circuit plurality of internal processing resources for concurrent execution of a plurality of program instructions stored in memory, comprising:
   instruction queue means for receiving from memory and temporarily storing instructions to be executed in said concurrent vector signal processor;
   captive vector signal processing resources interconnected through internal bus lines and including a fetch unit, a control unit, execution unit and storage means for storing instruction and data information, predetermined ones of said vector signal processing resources can be captive until completion of execution of an instruction which uses said vector signal processing resources;
   resource manager means coupled through said internal bus lines to said captive vector signal processing resources for managing selection and initialization of said vector signal processing resources in executing instructions;
   said resource manager means being coupled through an internal bus to said instruction queue means for reading instructions, said resource manager means including means for predecoding first instructions in the instruction queue and including means for identifying selected vector signal processing resources which are required to execute said first instructions;
   said resource manager means further including means for issuing initialization commands to said selected vector signal processing resources for executing said first instructions.

2. The system of claim 1 wherein said storage means includes random accessory memory means.

3. The system of claim 1 wherein said storage means includes storage registers.

4. The system of claim 3 wherein said storage registers include control registers.

5. The system of claim 3 wherein said storage registers include address registers.

6. The system of claim 3 wherein said storage registers include arithmetic registers.

7. The system of claim 1 wherein each of said processing means includes resources for executing signal processor instructions.

8. The system of claim 1 wherein each of said processing means includes resources for moving data between internal and external memories.

9. The system of claim 1 wherein each of said processing means includes resources for controlling operation of said vector signal processor.

10. The system of claim 1 wherein each of said processing means includes resources for fetching instructions for said vector signal processor.

* * * * *